(12) United States Patent
Flinta et al.

(10) Patent No.: US 11,050,645 B2
(45) Date of Patent: Jun. 29, 2021

(54) METHOD AND NODE FOR DISTRIBUTED NETWORK PERFORMANCE MONITORING (71) Applicant: Telefonaktiebolaget LM Ericsson (publ), Stockholm (SE)

(72) Inventors: Christofer Flinta, Stockholm (SE); Farnaz Moradi, Stockholm (SE); Mathew Clegg, Uppsala (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 72 days.

(21) Appl. No.: 16/619,936

(22) PCT Filed: Jun. 5, 2018

(86) PCT No.: PCT/SE2018/050583
§ 371 (c)(1),
(2) Date: Dec. 5, 2019

(87) PCT Pub. No.: WO2018/226146
PCT Pub. Date: Dec. 13, 2018

(65) Prior Publication Data
US 2020/0145307 A1 May 7, 2020

Related U.S. Application Data (60) Provisional application No. 62/516,427, filed on Jun. 7, 2017.

(51) Int. Cl.
*H04L 12/26* (2006.01)
*G06F 16/2458* (2019.01)

(52) U.S. Cl.
CPC ........ *H04L 43/067* (2013.01); *G06F 16/2471* (2019.01); *H04L 43/12* (2013.01)

(58) Field of Classification Search
CPC ....... H04L 43/067; H04L 43/12; H04L 43/06; H04L 43/065; H04L 43/0876; G06F 16/2471; G06F 11/3495
See application file for complete search history.

(56) References Cited

U.S. PATENT DOCUMENTS

| 2009/0010205 A1* | 1/2009 | Pratt, Jr. ........... H04W 56/0015 370/328 |
| 2014/0165070 A1 | 6/2014 | Persikov et al. |
| 2016/0011925 A1* | 1/2016 | Kulkarni ............. G06F 11/3006 714/57 |

FOREIGN PATENT DOCUMENTS

WO 2016/183028 A2 11/2016

OTHER PUBLICATIONS

International Search Report and Written Opinion for International Application No. PCT/SE2018/050583, dated Sep. 21, 2018, 15 pages.

(Continued)

*Primary Examiner* — Thai Nguyen
(74) *Attorney, Agent, or Firm* — NDWE LLP (57) ABSTRACT A method and a node for distributed performance monitoring in a communication network comprising a set of nodes. Each node in the set is configured to operate alternatively as a monitor node or as a sensor node and wherein each monitor node in the network is configured to perform measurements together with a corresponding sensor node. The monitor node determines (from a priority list) the sensor node which has the highest priority and sends a first query to that sensor node. The sensor node on its side has a listening period for receiving queries. When the listening period expires, the sensor node selects the monitor node having the highest query priority and performs measurements together with said selected monitor node.

14 Claims, 3 Drawing Sheets (56) References Cited

OTHER PUBLICATIONS

Rezaul Hoque et al., "Scalable Network Tomography System," Nov. 30, 2009, 75 pages, Master of Science Thesis, Stockholm, Sweden.
Rezaul Hoque et al., "A Self-Organizing Scalable Network Tomography Control Protocol for Active Measurement Methods," Jul. 11, 2010, 8 pages.
Farnaz Moradi et al., "ConMon: an Automated Container Based Network Performance Monitoring System," May 2017, pp. 54-62, IFIP/IEEE International Symposium on Integrated Network Management (IM2017).
Mathew Clegg, "Scheduling Network Performance Monitoring in the Cloud," Jun. 2017, 71 pages, UPTEC IT 17 011, Uppsala Universitet.
Venkat Mohan et al., "Active and Passive Network Measurements: A Survey," 2011, pp. 1372-1385, International Journal of Computer Science and Information Technologies (IJCSIT), vol. 2 (4).
S. Waldbusser, "Remote Network Monitoring Management Information Base," Feb. 1995, 91 pages, Network Working Group, Request for Comments: 1757.
International Preliminary Report on Patentability, PCT App. No. PCT/SE2018/050583, dated Dec. 19, 2019, 12 pages.
Supplementary European search report and search opinion, EP App. No. 18813213.8, dated Jan. 25, 2021, 8 pages.

\* cited by examiner

METHOD AND NODE FOR DISTRIBUTED NETWORK PERFORMANCE MONITORING

CROSS-REFERENCE TO RELATED APPLICATIONS

This application is a National stage of International Application No. PCT/SE2018/050583, filed Jun. 5, 2018, which claims priority to U.S. Application No. 62/516,427, filed Jun. 7, 2017, which are hereby incorporated by reference.

TECHNICAL FIELD

The application relates to a method and a node for distributed performance monitoring in a communication network.

BACKGROUND

Many enterprises are currently required to digitalize their business to reach customers, vendors, partners, essential applications, etc. This digitalization is often performed by consuming services being offered by the cloud. Ever since, the amount of cloud services has grown in number while they are rapidly evolving, over time. Consequently, underlying infrastructure such as data centres and networks, must synonymously evolve to sustain the increased demand of centralized computation. Thus, data centres and network infrastructure are increasing in both size and intricacy. As the dependence of cloud services are increasing, providers struggle to deliver certain metrics of the cloud, defined in the Service Level Agreement (SLA). Due to the increasing complexity of the data centre infrastructures that are hosting cloud services, it has also become harder to monitor the data centre network. For instance, virtualization has enabled one physical machine to run multiple, separated operating systems on the same host. Thus, adding another level of indirection by introducing a virtualization layer to monitoring.

New technological trends have emerged for the purpose of isolating and deploying applications. The trends are based on a virtualization technique called container virtualization. Container-based virtualization can be described as lightweight virtualization, where only the kernel of the operating system is virtualized, instead of virtualizing an entire machine. Container virtualization is gaining popularity due to the low overhead of resources. Container orchestrating platforms, such as Docker can also provide resource restriction and alleviates container deployment. In addition to server virtualization, modern networks are transformed into virtualized networks. Using virtualized networks, enables the network to simply adapt and scale per current usage. This is done, namely by getting rid of proprietary hardware middleware boxes, which implements one or more well defined functions, such as firewalls, intrusion detection systems and proxies. These middleware boxes are then implemented in software and connected to the network to reduce the overall complexity of the network, concurrently increasing the functionality and overview of the network. Container orchestration platforms often require virtualized networks for internal and external communication.

A containerized distributed performance monitoring system called ConMon is described in the paper "*ConMon: an Automated Container Based Network Performance Monitoring System*" by Moradi et al (IFIP/IEEE Symposium, May 2017). Its purpose is to monitor container resource consumption and end-to-end network performance from an application perspective. ConMon dynamically adapts to changes in application communication flows. The ConMon monitor can monitor container resource utilization and perform both passive and active network monitoring.

ConMon is a distributed system and the monitoring is performed by deploying monitoring containers on physical servers, running containerized applications. By allowing the monitoring containers to run adjacent to the applications, monitoring will be performed from an applications point of view, while still preserving application isolation.

Since the active monitoring system is distributed, the algorithm for scheduling the probing and the measurements need to adhere to this intent. Implementing distributed schedulers requires the scheduling decisions to be based on less information compared to a centralized scheduling model. Suitable algorithms for this are for example Round Robin or Controlled Random Scheduling, CRS.

Round Robin is a simple scheduling algorithm, often used in network schedulers such as DNS load balancers and best effort packet switches. Round Robin is a scheduling algorithm built around executing jobs in fixed slices of time units or work cycles, called a Scheduling Quantum or just Quantum. During this quantum, only one job is performed whilst the rest of the queue must wait for its own turn. When one quanta reach its limit such as a time limit or one job completes, the next scheduled job will be executed. For finite scheduling this process will continue until all the jobs complete, and for infinite scheduling the process will continue to schedule the upcoming job.

Due to Round Robins non-concurrent nature two things are guaranteed; No starvation of a process, since all the processes get a fair amount of time executing, and no measurement conflicts since Round Robin is not concurrent by default.

Even though Round Robin fulfills the conditions of avoiding both measurement conflicts and starvation, it will not scale well. This is due to its lack of concurrent execution. When the number of nodes to be monitored increases, the number of jobs to be scheduled will increase at scale. Since no concurrent measurements are done by default, the only way for a system with an increased number of nodes to reach full monitoring coverage, that is when all machines have been monitored at least once, would then be to decrease the time it takes to monitor each machine.

Controlled Random Scheduling, or CRS, is a scheduling method proposed in the thesis work "*Scalable Network Tomography System*" by Hoque, November 2009 and in the paper "*A Self-Organizing Scalable Network Tomography Control Protocol for Active Measurement Methods*" by Hoque et al, July 2010.

CRS is a distributed scheduling algorithm developed for scheduling of active measurements in networks. The scheduler is designed to reduce the total measurement time, by allowing concurrent measurements. To avoid network congestions only a specified amount of concurrent measurements is being performed in the network. The number of desired concurrent measurements in the network is set from the start by intents. To run CRS in the cluster, each node must know how to reach the other nodes at the given time of scheduling. CRS assumes that each node can be in one of the two states; Measurement state and the Sensor state at a given point of time.

By alternating between these states over time, each node can either be in measurement state or in sensor state. Switching between the states is performed by a Controlled Random Function. The Controlled Random Function makes the decision randomly by using pseudo randomizers to randomize a number, and then comparing it against a certain threshold. If the number exceeds this threshold, the node will become a Measure node, otherwise it will become a Sensor node. By setting the threshold, the desired ratio of Measure and Sensor nodes can be expressed. However, the decision is still made randomly, thus Controlled Random Scheduling. This decision is then repeated periodically for all nodes in the cluster.

The CRS adheres to the following steps to perform measurements without measurement interference randomly and concurrently:

1. Role decision based on the controlled random function, dividing the nodes into Measure and Sensor nodes.
2. If the node is a Measure node
   a. pick the first node randomly from the list of known nodes and send a monitoring request.
   b. If the node is a Sensor node and is free, start monitoring.
   c. Else move on to the next node in the list and repeat 2.b
   d. When the time t expires, repeat from 1.
3. If the node is a Sensor node:
   a. If free, accept incoming monitor request
   b. Deny other measurement request whilst measuring
   c. Once the measurement is done, repeat 3.a
   d. When the time t expires, repeat from 1.

Using the scheduling algorithm above allows the system to perform concurrent and distributed monitoring scheduling whilst still avoiding measurement conflicts by rejecting conflicting requests.

Nevertheless, the CRS algorithm lacks the guarantee that a Measure—Sensor pair will be monitored once, also known as starvation. In the thesis "*Scalable Network Tomography System*" simulations of the algorithm show that the algorithm never manages to measure all sensor/monitor pairs over the simulated timespan.

SUMMARY

With this background it is the object of the embodiments described below to obviate at least some of the disadvantages mentioned above.

The object is achieved by a node configured to operate alternatively as a monitor node or as a sensor node and wherein each monitor node in the network is configured to perform measurements together with a corresponding sensor node and that each monitor node is configured with a sensor node priority list.

When the node is set to operate as a monitor node it is configured to:
  update the sensor node priority list from the last measurement,
  determine the sensor node which has the highest priority in the sensor node priority list,
  send a first query to the determined sensor node to perform measurements,
  if the query is granted, perform the measurements together with the sensor node and report the result.

When the node is set to operate as a sensor node it is configured to:
  during a predetermined period of time listen for queries to perform measurements from at least one monitor node,
  when the predetermined period of time for listening has expired, select the monitor node for which the query has the highest priority, return a query grant to the selected monitor node, return a query denied to each one of the remaining querying monitor nodes and perform the measurements together with the selected monitor node.

The object is further achieved by a method for performing measurements in a network comprising a set of nodes wherein each node in the set is configured to operate alternatively as a monitor node or as a sensor node and wherein each monitor node is configured to perform measurements together with a corresponding sensor node. Each monitor node is further configured with a sensor node priority list.

When the node is set to operate as a monitor node the method comprises the following steps:
  updating the sensor node priority list from the last measurement,
  determining the sensor node which has the highest priority in the sensor node priority list,
  sending a query to the determined sensor node to perform measurements,
  if the query is granted, performing the measurements together with the sensor node and reporting the result.

When the node is set to operate as a sensor node the method comprises the following steps:
  listening during a predetermined period of time for queries to perform measurements from at least one monitor node,
  selecting when the predetermined period of time for listening has expired, the monitor node for which the query has the highest priority,
  returning a query grant to the selected monitor node,
  returning a query denied to each one of the remaining querying monitor nodes and
  performing the measurements together with the selected monitor node.

Among the advantages is that the method shows a more consistent scheduling pattern than the CRS scheduler, and better scalability metrics in terms of the average time an application must wait for a monitoring event and the time required to reach a full monitoring coverage.

Optionally, in the embodiments where the schedulers are implemented to run inside containers, where the purpose is to deploy the scheduling container on the same server as the running application, the monitoring gives a better understanding of network performance from an application point of view.

The embodiments will now be described in more detail and referring to accompanying drawings.

DETAILED DESCRIPTION

Network Monitoring.

Network monitoring is the process where network metrics are measured to examine how the network behaves. Network monitoring is essential for large networks, where the different actors of the network have diverse interests of the network performance. For instance, service providers, can measure the network to inspect what kind of services they can offer to consumers.

There are different ways to observe and quantify network behavior, when monitoring networks and the methods can work on a microcosmic and a macrocosmic scale. In addition, networks can be measured passively or actively depending on measuring techniques. By measuring different aspects of the network, administrators and engineers can use the data for:

Troubleshooting: Network diagnostics and fault identification

Performance Optimization: Identifying bottlenecks in the network and load balancing Network development and design: Finding needs for new network functions Planning and forecasting of current and coming network workloads Computer aided understanding of the network complexity A summary of key aspects of network monitoring for the different actors has been listed in the paper "Active and passive network measurements: a survey," by V. Mohan et al, Int. J. Comput. Sci. Inf. Technol., vol. 2, no. 4, pp. 1372-1385, 2011. The summary is reproduced in the table below:

| Who | Goal | Measure |
| --- | --- | --- |
| Internet Service Providers (ISP) | Capacity Planning Operations Value-aided-services, such as customer reports Usage based billing | Bandwidth utilization Packets per second Round Trip Time RTT RTT variance Packet loss Reachability Circuit performance Routing diagnostics |
| Users | Monitor Performance Plan Upgrades Negotiate service contracts such as SLA Optimize content delivery Usage policing | Bandwidth availability Response time Packet loss Reachability Connection rates Service qualities Host performance |
| Vendors | Improve design and configuration of equipment Implement real-time debugging and diagnostics of deployed network functions | Trace samples Log analytics |

Network monitoring separates passive monitoring from active monitoring depending on whether the monitoring method generates probe packets which are injected into the network or if the method uses the existing network data to provide information. Passive monitoring monitors existing network flows, where no probing is performed and thus it can measure the network without changing the network behavior. Active monitoring, on the other hand, injects data into the network and observes the behavior of the injected data. Hence active monitoring might affect the network and receiving nodes while monitoring.

Active Monitoring.

Active monitoring measures the network by examining the behavior of special data packets, called probe packets, that are generated and injected into the network. The generated packets can be of a variety of types, depending on what they are supposed to measure. This could be a TCP packet with no payload at all, or an UDP packet only containing a timestamp. Active measuring tools often probe these packets since they must be carefully constructed to represent actual network traffic. These representations can vary from packet size to the packets prioritizing in the router. Since active measurements injects probe packets into the network to obtain observations, it consumes network bandwidth, which can cause network interference and measuring interference if two or more measurements are performed simultaneously. The network interference is directly derived from the amount of traffic in the current network while measuring interference can be caused by, not only the increased amount of traffic in the network, but also the analyzing load on the targeted server.

It is important to understand that a busy server CPU can cause increased latency and TCP timeouts, interpreted as packet losses, which is not directly related to network issues. Thus, active monitoring often requires scheduling to prevent measurement interference.

Passive Monitoring.

Passive network monitoring gather network metrics from existing data flows in the network. It is often performed by listening to traffic, which is duplicated in the network with link splitters or hubs but could also be performed by analysis of router buffers. One common passive monitor is RMON, as described in RFC 1757 'Remote Network Monitoring Management Information Base' which allows remote passive monitoring from a central location where statistics and alarms can be generated by any time. One of the main benefits of using a passive monitor is that the passive monitor does not inject any probe packets into the network. Thus, measurement interference cannot occur when using a passive monitor. However, the passive monitor works through gathering statistics from aggregated data. For high speed networks and data centers the amount of data generated can cause problems for some systems, using several passive capturing points in the network. Modern passive monitors tend to optimize and reduce the amount of disk required to perform accurate analysis, through compression and removal and statistical sampling of data.

ConMon.

ConMon is a distributed, automated monitoring system for containerized environments. The system was developed foremost to adapt to the dynamic nature of containerized applications, where the monitoring adapts to accomplish accurate performance monitoring of both computer and network resources. The monitoring is performed by deploying monitoring containers on physical servers, running containerized applications. By allowing the monitoring containers to run adjacent to the applications, monitoring will be performed from an applications point of view, while still preserving application isolation.

ConMon Architecture.

The distributed monitoring system is composed of a variety of monitoring containers running adjacent to the application containers, residing on the same physical server. The two main monitoring agents are the Passive Monitor (PM) and the Active Monitor (AM). To automate and enforce monitoring intents, the system uses an additional Monitor Controller (MC).

Monitoring Containers.

A monitor container is the running component of the distributed system. The monitoring containers deploys a Monitor Controller Container together with additional monitoring functions adjacent to the application(s) to monitor. Each application container that is to be monitored, should have monitoring containers on the same server, where the monitoring containers should be connected to the same virtual switch as the application container.

Monitor Controller Container.

The monitor controller is the core component of the ConMon system. On each physical server, running monitoring containers, a monitor controller will be deployed. These monitor controllers will communicate with each other in a distributed fashion while allowing the system to communicate with other management layers. The monitoring controller, controls both the passive and active monitoring of the network, though dynamic monitoring configurations. It can also receive new intents and requests through the management layer. Each server only need one monitoring controller.

Passive Monitoring Container.

The passive monitoring container is responsible for the passive monitoring of the network, see Passive Monitoring. The passive monitoring containers monitors the applications network flows by analyzing the packets flowing through the virtual switch. This flow monitoring is performed through configuration of port mirroring or tapping in the virtual switches of the server. When monitoring containers are deployed in a server, the monitor controller requests the switch to send a copy of the incoming packets to the passive monitor container. These packets will be used to evaluate flow matrices, perform passive network monitoring and to dynamically adapt monitoring by sending information to the Monitor Controller. A server running multiple application containers only requires a single Passive Monitor, if the applications belongs to the same entity.

Active Monitor Container.

The active monitor container is responsible for the active monitoring of the network, see Active Monitoring. The active monitor is connected to the same virtual switch as the application containers it is responsible to monitor. The active monitor performs end-to-end monitoring by sending probe packets to other active monitors around the network, thus the active monitors will act as both senders and receivers of probe packets. As the active monitor is a separate entity from the application traffic, only one active monitor per server is adequate to perform precise active monitoring.

Collaboration of Monitoring Containers.

The monitoring containers running on the server are autonomous applications (such as Microservices) running inside isolated containers. These applications may communicate through web services to act as one distributed system. Some of the key functions of the ConMon monitoring system and how the distributed monitoring containers communicate to accomplish accurate network monitoring, is described below:

Instantiation of Monitoring Containers

The monitoring containers are instantiated by the local server-specific monitoring controller. The monitor controller listens and acts on events triggered by the container management system or orchestrator, such as Docker. Once an application is deployed on the physical server, the monitor controller catches the event and triggers a request to deploy monitoring functions, from the container management system. When the monitoring containers are deployed, the monitoring controller attaches the newly deployed monitoring containers to the same virtual switch as the newly deployed application container is connected. The monitoring controller then configures the switch to perform packet tapping or packet mirroring to the passive monitoring container. The passive monitoring containers analyses the application containers packet flows and determines which remote servers to monitor actively. The application flow maps are then sent to the Monitoring Controller and can be used later for active monitoring scheduling and monitor discovery.

Discovery of Remote Monitors.

Most active measurements require the measurer and receiver of the measurements to identify each other in the network. The identification is also important for synchronization and latency measurements. If the information about the remote monitoring is not provided in advance, monitoring discovery is essential to find the remote monitors. The automatic remote monitor discovery is performed by passively gathering flows in the passive monitoring containers where the source and destination IP of the packets are used to identify the IP of the remote container. Once the remote application containers have been identified the monitoring controller must find the corresponding remote monitoring controller for the remote application container. The query for accessing the IP of a remote monitoring controller can be implemented through a variety of services such as distributed data bases or injected through monitoring intents.

The described embodiments below are based on a scheduler algorithm that is an improvement of the Controlled Random Scheduling CRS algorithm. The algorithm will henceforth be referred to as the Controlled Priority-based Scheduler, CPS. CPS inherits the concurrent and distributed properties from CRS where each node is being allowed to switch between a monitor and a sensor node at a given random period. In addition, a static period can be set for the time the node should spend in each state.

The CPS algorithm, however, uses a priority-based scheme to decide which monitor/sensor pairs to measure. The CPS algorithm will strive to achieve more consistency in measuring intervals, by always trying to measure the node with the given highest priority. This will result in a cyclic-alike pattern where the monitor/sensor pairs that haven't been monitored for the longest period will be prioritized over the remaining possible monitor/sensor node pairs.

The priority in the described embodiments uses the current time difference between last monitoring event. The choice of time as priority is based on the evaluation of scalability and scheduler performance in addition to reducing the time between periodical measurements. Nevertheless, other types of priority could be implemented.

The priority-based scheduler CPS is designed to prevent starvation and in addition, get a more consistent monitoring period, between all the monitor/sensor pairs. For the CRS scheduler on the other hand, it is possible to measure the same monitor/sensor pair repeatedly in a short interval of time, whilst neglecting other monitor/sensor pairs during that period.

Controlled Priority Scheduler (CPS) Modules.

Figure 2:
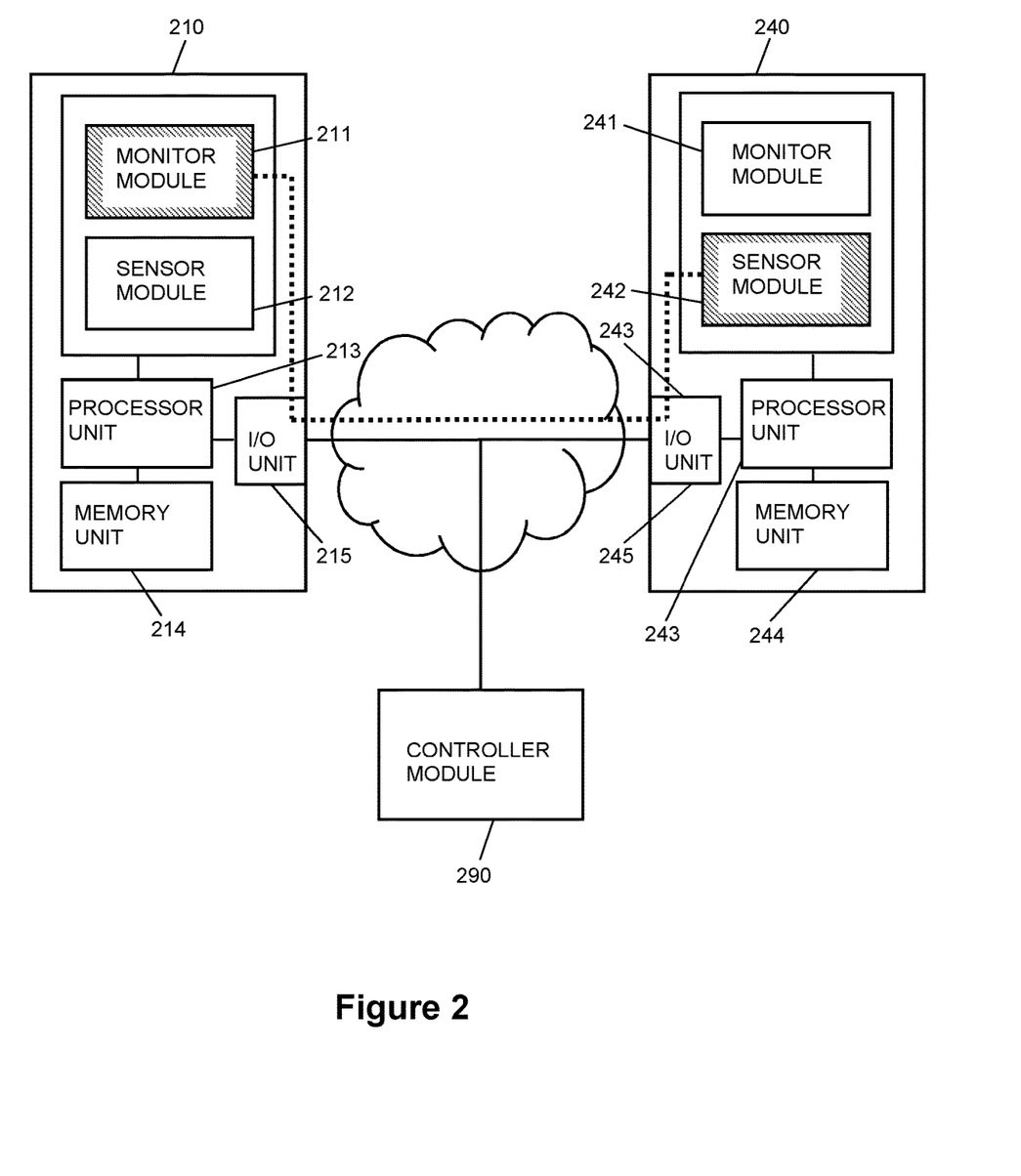
FIG. 2 is a detailed block diagram illustrating a monitor and a sensor node and a controller module.

FIG. 2 illustrates two nodes 210, 240 each with the basic modules for the scheduling consisting of a monitor module 211, 241 and a sensor module 212, 242. FIG. 2 also illustrates a controller module 290. The monitor and sensor modules are used in the two different states; the Monitoring state and the Sensor state, while the controller module's 290 main responsibility is to handle the time each node should spend in each state.

A node, currently in the monitor state is referred to as a monitor node, while a node in the sensor state is referred to as a sensor node.

Figure 1:
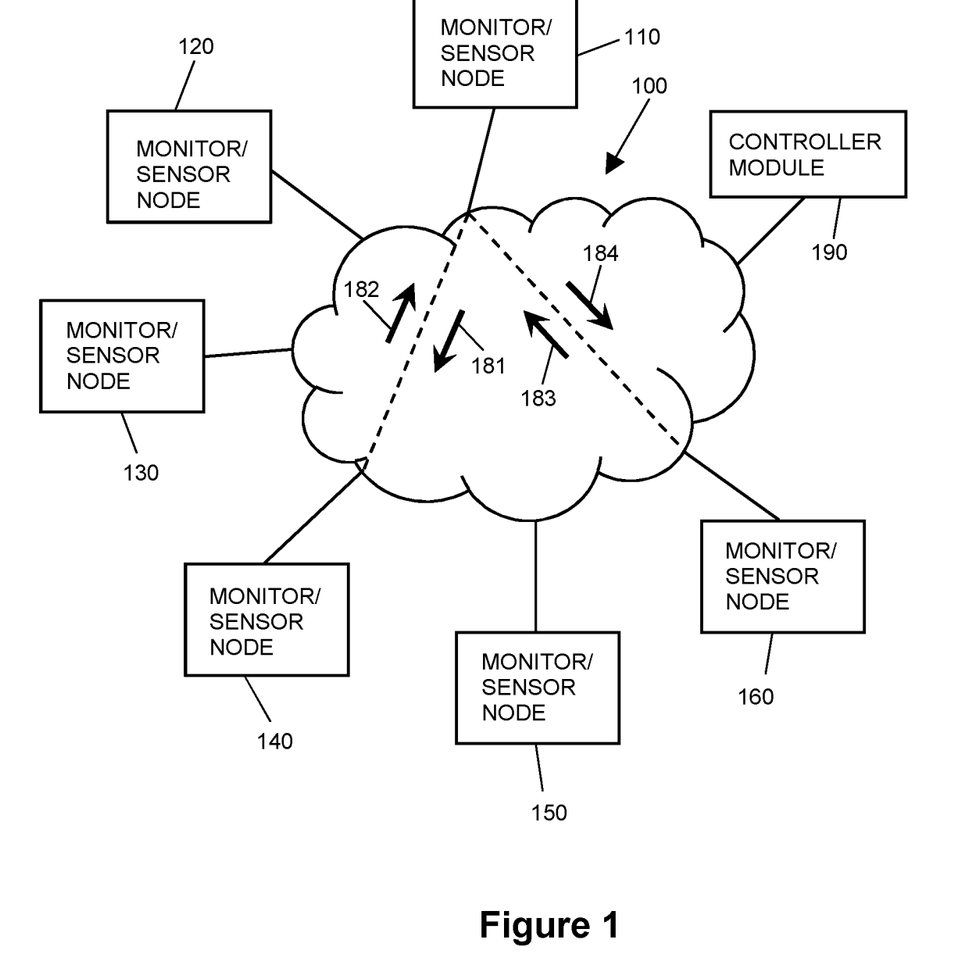
FIG. 1 is a block diagram illustrating a distributed network with a set of nodes wherein each node in the set is configured to operate alternatively as a monitor node or as a sensor node.

FIG. 1 illustrates a network 100 with a set of nodes 110-160 and a controller module 190 wherein each node in the set is configured to operate alternatively as a monitor node or as a sensor node according to the embodiments described below.

When node 110 operates as a monitor node it sends queries 181 to a determined sensor node 140 and if the query is granted, the sensor nod 140 returns a query grant 182 and the monitor node 110 and the sensor node 140 performs the measurements together.

When node 110 operates as a sensor node it may receive queries 183 from several monitor nodes 160 etc. If the query is granted, the sensor node 110 returns a query grant 184 to the monitor node 160.

Sensor Module

The sensor module's 212, 242 main responsibility is to grant access to the measure request with the highest priority, sent from a monitor node. This monitor approval is implemented by letting the sensor node having a listening period for a predetermined period of time (eg a fixed number of seconds). During the listening period the sensor node will store the request and the corresponding priority, leaving the monitor node waiting. If another request arrives during the listening period, the sensor node will compare the priorities between the two requests and store the request with the highest priority, followed by sending a denying monitoring response to the node who sent the lower priority request. This process will repeat until the listening period expires. Then the sensor node will send a granting monitoring response to the stored monitor node with the highest priority.

After granting a monitoring request the sensor node will deny all incoming monitoring requests for a time period, enough for the monitoring event to complete. If the monitor event completes before the expiration time, the monitor node will reset the sensor node. This expiration time prevents the sensor nodes from blocking incoming requests if the monitor node would fail to unlock the sensor node during a monitoring event. Once the monitor node has completed the monitoring event, the sensor node will go back to the listening state.

Monitor Module

The monitor module 211, 241 is responsible for obtaining the first listening sensor node with the highest priority. This feature is implemented by referencing all the host endpoints in a sorted list, containing a reference to the host endpoints and their corresponding priorities. The list is sorted based on priority in a descending order. The monitor node will then send a monitoring request to the first host in the list. Due to the sensor node's listening period, the monitor node will have an expiration time on the request, that is set to for example one second longer than the sensor's listening period. If the request waiting period exceeds the expiration time, the monitor node will remove the node from the list of potential sensor hosts. This expiration could be due to a faulty sensor node where the expired connection will be reported as an error. However, if the sensor node is functioning correctly, the monitor will receive a monitoring response, containing information about the sensor node. The response will tell the monitor if the host is in the sensor state, if the node is busy or not and if the request has been granted.

On a granted request the monitor node will open monitoring servers on the sensor node and perform the monitoring event. Once completed the servers will be closed and the monitor node will report the results. If, however, the monitor event contains errors the monitor will not close the servers, depending on the error type. If the port is busy, this could for instance be a user triggered event and thus the servers should remain open. On a successful monitoring event, the monitor module will restart its process by re-referencing the host endpoints and priorities in a sorted list.

If the monitoring request is denied however, the monitor node will remove the host from the sorted list and try the second highest priority in the list. If the requests for all nodes in the list are denied, the monitor node will wait a period for the system to change state, and then repeating by re-referencing the host endpoints in a sorted list.

Controller Module

The controller module's 190, 290 main responsibilities are initiation of the node state, adding healthy monitoring host endpoints, removing unreachable host endpoints, randomizing the time the node should spend in the sensor and monitoring mode, and switching modes. The controller module initializes by randomizing the node state, to a monitor or a sensor state. Once the initial state is set, the controller module will then randomize the time the node should spend in the sensor and monitor state. The minimum and maximum time will scale according to the number of nodes in the cluster. The controller module will give the monitor and sensor mode the same amount of time based on: If the node has performed monitoring for a long period, it should receive monitoring for a long period.

If the node has performed monitoring for a short period, it should receive monitoring for a short period. It is possible to set a static scheduled time for the controller module, to decide how long each node should spend in the monitoring and sensor state.

The sensor mode is always followed by the monitoring mode, before the controller module randomizes a new sensor/monitor interval for the mode. Between the switching between the sensor mode and the monitoring mode, the controller module allows all measurement events to complete by waiting a fixed amount of time.

The table below shows an overview of the different components' main responsibilities:

| Sensor Module | Controller Module | Monitor Module |
| --- | --- | --- |
| Accept and respond to Monitoring Requests: on initiation after a successful monitoring event after a time-out | Add new nodes to the monitor system | Obtain the sensor node with the highest priority that is listening to monitor requests |
| Deny Monitoring Requests during a monitoring event | Remove nodes that are not longer responding from the monitor system | Send monitor requests |
| Keeping track of the current request with the highest priority during a listening event | Setting the time the node will spend in the sensor/monitor mode. Can be static or random | Perform the monitoring event, on an approved monitoring request |
| Approving monitoring for the request with the highest priority | Switching the node between the states | Starting and stopping remote monitoring servers |
| Denying requests with priorities lower than the current highest priority | Initiation of states | Reporting the result |

Optionally, a sensor node can grant measurement permission to different monitoring requests that do not conflict with other measurements. For example, an ICMP ping can be executed concurrently with other measurements such as bandwidth measurements.

Figure 3:
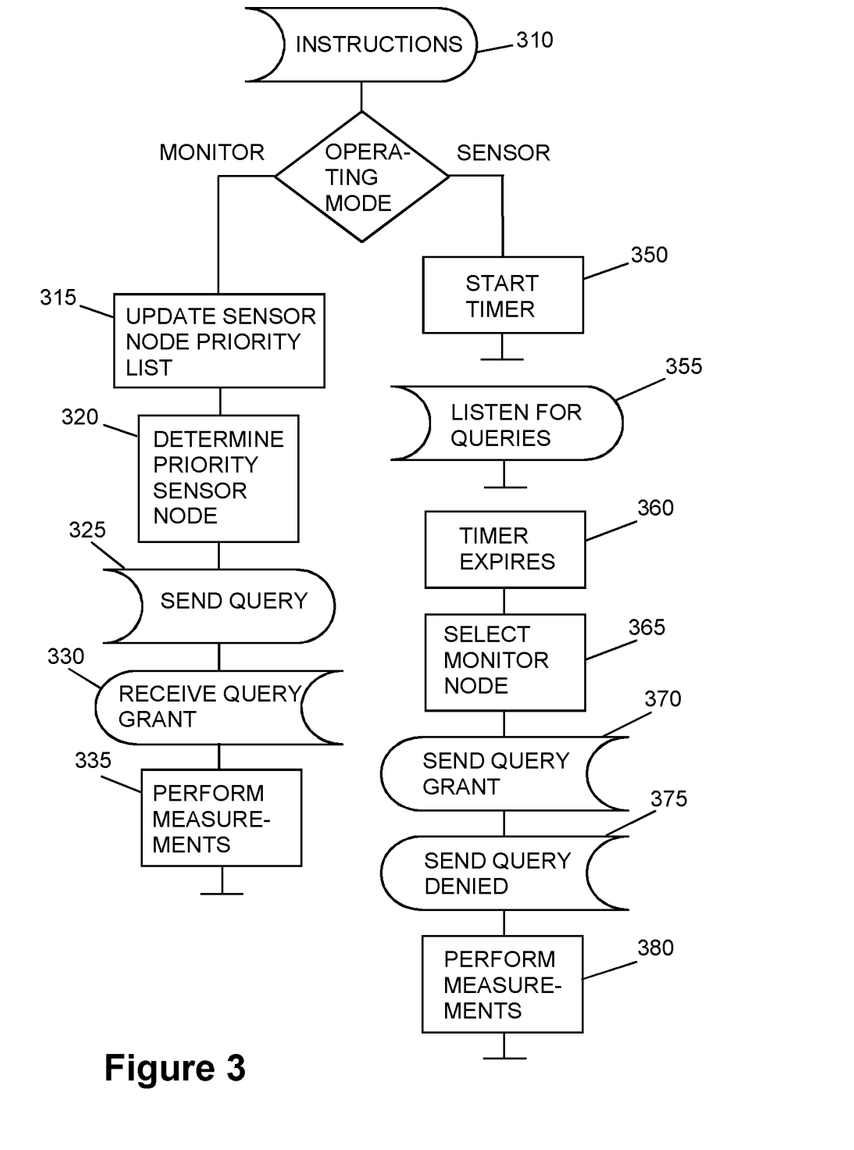
FIG. 3 is a flow charts illustrating an embodiment of the method for performing measurements in a distributed network.

An example on how to perform the distributed network measurements according to one embodiment is illustrated by the flow chart in FIG. 3 and described below.

Before starting the actual measurement, the controller module 290 in this example has in step 310 instructed the nodes 210,240 to operate as a monitor node and as a sensor node respectively.

Monitor node 210 updates its priority list of sensor nodes to query in step 315. In step 320 the monitor node 210 determines the sensor node in the priority list that has the highest priority.

As said above, the priority in the described embodiments is a function of the current time difference between the last monitoring event. That is, the monitor/sensor pairs that haven't been monitored for the longest period will be prioritized over the remaining possible monitor/sensor node pairs. But again, other types of priorities could be implemented. For example, the priority of a node can dynamically be increased if the network latency between two application containers has to be monitored more frequently since a time-critical task is being executed. After the task is finished, the monitoring priority can be reset.

In the meantime, sensor node 240 has started a timer in step 350 for listen for queries (step 355) from several monitor nodes during a predefined time period.

In step 325 the monitor node 210 sends a query to the determined sensor node 340.

When the timer for the predefined time period to listen for queries in the sensor node 240 expires in step 360, the sensor node 240 selects in step 365 the monitor node 210 with the query having the highest priority (in this case, the query that was received first during the listening period). The sensor node 240 sends in step 370 a query grant to the monitor node 210 which receives the grant in step 330. If the sensor node has received queries with lower priorities from other monitor nodes during the listening period, it sends a query denied to these nodes in step 375.

When the monitor node 210 has received the query grant in step 330 it starts to perform the measurements together with the determined sensor node 240 in steps 335,380. An embodiment of the method described in pseudocode is found below:

```
1. Get list of nodes
2. Receive start event
3. Optional: choose role selecting method(random/scheduled)
4. Loop
        1. Select role (monitor/sensor) according to role selection
        method
        2. Update list of nodes
        3. If monitor role
                1. Loop:
                        1. Update priorities based on time since last
                        measurement event
                        2. Sort list of nodes based on priority in descending
                        order
                        3. Select first node in list (node with highest
                        priority)
                        4. Loop:
                                1. Send measurement query to selected node
                                2. If permission not granted or no response is
                                received during time T1
                                        1. If selected node is not last node in
                                        list
                                                1. Select next node in list
                                        2. Else (no more items in list)
                                                1. Wait during time T2
                                3. Else (permission is granted)
                                        1. Lock the selected node for time T3 to
                                        reject all incoming monitor queries,
                                        starting/stopping of servers *)
                                        2. Commit measurement to selected node
                                        during time T4 and store results
                                        3. Unlock selected node
        4. If sensor role
                1. Loop:
                        1. Listen to measurement queries from monitors during
                        a time T5
                                1. If incoming query
                                        1. If no stored query
                                                1. Store incoming query
                                        2. Else (there is a stored query)
                                                1. Compare priority of the new
                                                query to the stored query
                                                2. Reject the query with lower
                                                priority and update storage to save
                                                query with highest priority
                        2. If there is a stored query
                                1. Grant permission to query
                                2. Listen to measurement queries from monitors
                                during a time T4 from granting
                                        1. If incoming query
                                                1. Reject the query
                        3. If sensor locked after time T3 from granting
                                1. Unlock sensor
*) The server could for example be an Iperf tool. Iperf is a
commonly used tool for estimating the end-to-end throughput,
latency, jitter, and packet loss rate across a path. Iperf is
implemented to use the client-server model where measurements
are performed by generating UDP or TCP flows in the client.
The generated packets are then injected into the network and
``` transmitted across a path to until it reaches the Iperf destination server. The packets are then analysed, and the results are returned to the client when the stream completes. Both the Iperf server and clients can be run in parallel by defining session specific ports for listening and sending.

An example of the method in Java code is shown below:

```
SensorNode
How the sensor handles incoming request during a listening
period.
public MonitorResponse nodeToGrantMeasure(MonitorRequest request){
if(!listening( ) || isBusy( )){
return new MonitorResponse(false);
}
//else – Randomize if priorities are equal
if (highest == null){
highest = request;
}else if(request.getRequestToMeasure( ).getPriority( ) >
highest.getRequestToMeasure( ).getPriority( )){
highest = request;
}else if(request.getRequestToMeasure( ).getPriority( ) <
highest.getRequestToMeasure( ).getPriority( )){
return new MonitorResponse(false);
}else{
highest = (ThreadLocalRandom.current( ).nextBoolean( )) ? highest :
request;
}
//Wait for listenTo – 0.1 time to expire prevent data races
while((listenTo-100) > System.currentTimeMillis( )){
try {
if(highest != request){
return new MonitorResponse(false);
}
sleep(100);
} catch (InterruptedException e) {
e.printStackTrace( );
}
}
highest = null;
return new MonitorResponse(true);
}
Sensor Node lock mechanism
public void setBusy( ){
this.isBusy = true;
this.timeout = System.currentTimeMillis( ) + this.errorTimeout;
}
//If the sensor have not been unlocked for a maximum time due to failer
from a monitornode
//the sensor will unlock itself
public boolean isBusy( ){
if(timeout == 0){
return isBusy;
}else{
isBusy = timeout > System.currentTimeMillis( );
return isBusy;
}
}
Sensor Node unlock mechanism
public void setNotBusy( ){
super.setNotBusy( );
listenTo = System.currentTimeMillis( ) + this.listeningPeriod;
}
In the superclass
public void setNotBusy( ){
isBusy = false;
timeout = 0;
}
Monitor Mode
Find a the most prioritized node that grants the
measurement request
private MeasureNodeModel obtainMeasureNode(MeasureNodes reference) {
if (reference.isEmpty( )) {
try {
sleep(2000);
} catch (InterruptedException e) {
```

```
e.printStackTrace( );
}
return null;
}
MeasureNodeModel node = reference.getHighestPriorityNode( );
if (node.getEndpoint( ).contains(properties.getMyIP( ))) {
node.resetPriority( );
reference.remove(node);
return obtainMeasureNode(reference);
}
try {
if (!sendMonitorRequest(node)) {
reference.remove(node);
return obtainMeasureNode(reference);
}
} catch (JsonProcessingException e1) {
reportToObserver("ERROR", "Parse error: " +
e1.getMessage( ),uriEndpoints.getUsers( ));
}
return node;
}
Controller
Switching between states
public void expiredTime(long starttime, long timeout){
isSensorNode = (System.currentTimeMillis( ) - starttime > timeout) ?
!isSensorNode :
isSensorNode;
}
public void monitorMode(long startTime, long timeout){
while(!isSensorNode){
try {
monitorMode.priorityMonitor(nodes);
expiredTime(startTime, timeout);
} catch(Exception e){
e.printStackTrace( );
System.out.println(e.getMessage( ));
}
}
}
public void sensorMode(long startTime, long timeout){
while(isSensorNode){
expiredTime(startTime, timeout);
try {
sleep(1000);
} catch (InterruptedException e) {
System.out.println(e.getMessage( ));
}
}
}
public void allowMeasurementsToComplete( ){
try {
sleep(10000);
} catch (InterruptedException e) {
System.out.println(e.getMessage( ));
}
}
public long getTimeout( ){
if(staticTimeout != 0){
return staticTimeout;
}
return ThreadLocalRandom.current( ).nextInt(20000, 60000 +
2*nodes.size( )*1000);
}
public void tick( ) throws JsonProcessingException {
long startTime = System.currentTimeMillis( );
long timeout = getTimeout( );
this.updateNodes( );
monitorMode(startTime, timeout);
startTime = System.currentTimeMillis( );
sensorMode(startTime, timeout);
allowMeasurementsToComplete( );
tick( );
}
Initiation and update
public Controller(GetNetworkProperties properties, UriEndpoints
uriEndpoints, CXSMonitorMode
monitorMode){
this.properties = properties;
this.uriEndpoints = uriEndpoints;
```

-continued

```
nodes = new MeasureNodes( );
this.updateNodes( );
isSensorNode = ThreadLocalRandom.current( ).nextBoolean( );
this.monitorMode = monitorMode;
}
public void updateNodes( ){
EndpointHandler endpointHandler = new EndpointHandler(properties);
nodes.addNewNodes(endpointHandler.refreshEndpoints( ));
endpointHandler.writeEndpoints(nodes);
properties.reportToObserver(nodes.removeBadNodes( ), "Removed bad nodes
",
uriEndpoints.getUsers( ));
}
```

The CPS scheduler has been compared with other decentralized schedulers based on Round Robin scheduling and the Controlled Random Scheduler (CRS). The schedulers were implemented to run inside containers, where the purpose was to deploy the scheduling container on the same host as the running application.

Scheduler Performance

Full coverage is defined as when all nodes have monitored all nodes, in other words when all possible monitoring pairs have been monitored at least once. As the amount of monitoring pairs is quadratic to the number of nodes in the cluster, a cluster containing N nodes will have: $N*(N-1) = N^2-N$ monitor pairs.

The tables below summarize the estimation of the time to reach full coverage as the cluster grows and the average waiting period for monitoring (x=number of nodes).

| Scheduler | Time to reach full coverage [Minutes] |
|---|---|
| Round Robin | $T = 0.2202x^2 - 0.0652x - 1.3742$ |
| CRS | $T = 3.5462x - 10.503$ |
| CPS | $T = 1.1158x + 0.6904$ |

| Scheduler | Average Waiting Period for Monitoring [Minutes] |
|---|---|
| CRS | $T = 0.3004x - 0.6042$ |
| CPS | $T = 0.407x - 0.7604$ |
| Theoretical | $T = 0.2242x$ |

In the evaluations of the CPS scheduler compared with other decentralized schedulers such as Round Robin scheduling or Random Scheduler (CRS), the CPS showed a more consistent scheduling pattern than the CRS scheduler, and better scalability metrics in terms of the average time an application has to wait for a monitoring event and the time required to reach a full monitoring coverage, when compared to Round Robin and CRS scheduling. The active monitoring scheduler gives a more reliable insight in how applications utilizes network performance, and how to perform concurrent monitoring, while avoiding conflicting monitoring events.

Returning to FIG. 2, the block diagram also illustrates a detailed but non-limiting example of how the two nodes 210,240 (here operating as a monitor node and as a sensor node respectively) may be structured to bring about the above-described solution and embodiments thereof. The node 210,240 may be configured to operate according to any of the examples and embodiments for employing the solution as described herein. The node 210,240 is shown to comprise a processor unit 213,243 and a memory unit 214, 244, said memory unit comprising instructions executable by said processor unit 213,243 whereby the nodes are operable as described herein. The node 210,240 also comprises a communication circuit (I/O unit) 215,245 for receiving and sending information in the manner described herein.

Abbreviations:
CPS Controlled Priority Scheduling
CRS Controlled Random Scheduling
DNS Domain Name Server
ICMP Internet Control Message Protocol
OS Operating System
SLA Service Level Agreement

The invention claimed is:

1. A node belonging to a set of nodes in a network, wherein each node in the set of nodes is configured to operate alternatively as a monitor node or as a sensor node and wherein each monitor node in the network is configured with a sensor node priority list and configured to perform measurements together with a corresponding sensor node, the node comprising:
   a processor; and
   a memory comprising instructions which, when executed by the processor, cause the node to perform operations comprising:
      receive instructions from a controller module for the node to initiate operations as a monitor node or as a sensor node;
      when the node is set to operate as the monitor node, the node is configured to:
         update a sensor node priority list for the node from a last measurement;
         determine a sensor node which has a highest priority in the sensor node priority list for the node;
         send a first query to the determined sensor node to perform measurements; and
         if the first query is granted, perform the measurements together with the determined sensor node and report a result of the measurements; and
      when the node is set to operate as the sensor node, the node is configured to:
         during a predetermined period of time, listen for queries to perform measurements from at least one monitor node; and
         when the predetermined period of time for listening has expired, select a monitor node for which a query has a highest priority from the queries listened to during the predetermined period, return a query grant to the selected monitor node, return a query denied to remaining querying monitor nodes and perform the measurements together with the selected monitor node.

2. The node according to claim 1, wherein when the node is set to operate as the monitor node, the node is further configured to:
if the first query is denied by the determined sensor node, determine a second sensor node that has a second highest priority in the sensor node priority list for the node; and
send a second query to the determined second sensor node to perform measurements.

3. The node according to claim 2, further configured to, when the node is set to operate as the monitor node, determine a further sensor node that has a next priority in the sensor node priority list for the node, as long as queries to the second sensor node are denied.

4. The node according to claim 3, further configured to, when the node is set to operate as the monitor node and if no sensor node has granted any queries, repeat the first query after a predetermined time.

5. The node according to claim 1, further configured to, when the node is set to operate as the sensor node, to deny further queries from other monitor nodes as long as the node performs measurements together with the selected monitor node.

6. The node according to claim 1 further configured to receive from the controller module an instruction to alternate between operating as the monitor node or as the sensor node.

7. The node according to claim 1, wherein a measurement priority of the node operating as the sensor node is a function of a time since a last measurement was performed by a monitor node together with the node and wherein a measurement priority of queries from the node operating as the monitor node is a function of a time of reception by a sensor node.

8. The node according to claim 1 being a physical server wherein the server comprises a monitor module and a sensor module, each module implemented as software containers configured to run on the server and further configured for the server to alternatively operate as the monitor node or as the sensor node respectively.

9. A method for performing measurements in a network comprising a set of nodes, wherein each node in the set of nodes is configured to operate alternatively as a monitor node or as a sensor node and wherein each monitor node is configured with a sensor node priority list and configured to perform measurements together with a corresponding sensor node, the method for a node of the set of nodes comprising:
receiving instructions from a controller module for the node to initiate operations as a monitor node or as a sensor node;
when the node is set to operate as the monitor node:
updating a sensor node priority list for the node from a last measurement;
determining a sensor node which has a highest priority in the sensor node priority list for the node;
sending a first query to the determined sensor node to perform measurements; and
if the first query is granted, performing the measurements together with the determined sensor node and reporting a result of the measurements; and
when the node is set to operate as the sensor node:
listening during a predetermined period of time for queries to perform measurements from at least one monitor node;
selecting, when the predetermined period of time for listening has expired, a monitor node for which a query has a highest priority from the queries listened to during the predetermined period;
returning a query grant to the selected monitor node;
returning a query denied to remaining querying monitor nodes; and
performing the measurements together with the selected monitor node.

10. The method according to claim 9, wherein when the node is set to operate as the monitor node, the method further comprising:
determining a second sensor node if the first query is denied by the determined sensor node, that has a second highest priority in the sensor node priority list for the node; and
sending a second query to the determined second sensor node to perform measurements.

11. The method according to claim 10 when the node is set to operate as the monitor node, further comprising determining a further sensor node that has a next priority in the sensor node priority list for the node, as long as queries to the second node are denied.

12. The method according to claim 9, wherein when the node is set to operate as the sensor node, denying further queries from other monitor nodes as long as the node performs measurements together with the selected monitor node.

13. The method according to claim 9 further comprising receiving from the controller module, instructions to alternate between operating as the monitor node or as the sensor node.

14. The method according to claim 9, wherein a priority of the node operating as the sensor node is a function of a time since a last measurement was performed by a monitor node together with the node and wherein a priority of queries from the node operating as the monitor node is a function of a time of reception by a sensor node.

* * * * *